US011733539B2

United States Patent
Lee et al.

(10) Patent No.: US 11,733,539 B2
(45) Date of Patent: Aug. 22, 2023

(54) APPARATUS AND METHOD FOR DISPLAYING THREE-DIMENSIONAL IMAGE

(71) Applicant: SAMSUNG ELECTRONICS CO., LTD., Suwon-si (KR)

(72) Inventors: Jinho Lee, Suwon-si (KR); Elena Malinovskaya, Moscow (RU); Igor Yanusik, Moscow (RU); Dong Kyung Nam, Yongin-si (KR); Yoonsun Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 16/681,406

(22) Filed: Nov. 12, 2019

(65) Prior Publication Data

US 2020/0192109 A1 Jun. 18, 2020

(30) Foreign Application Priority Data

Dec. 12, 2018 (KR) ........................ 10-2018-0159967

(51) Int. Cl.
*G02B 27/01* (2006.01)
*G02B 30/50* (2020.01)
*B60K 37/02* (2006.01)

(52) U.S. Cl.
CPC .............. *G02B 30/50* (2020.01); *B60K 37/02* (2013.01); *G02B 27/0101* (2013.01); *B60K 2370/1531* (2019.05); *G02B 2027/014* (2013.01)

(58) Field of Classification Search
CPC .... G02B 30/50; G02B 27/01; G02B 27/0101; G02B 30/27; G02B 27/0103; G02B 27/104; G02B 27/141; G02B 26/101; G02B 2027/0105; G02B 2027/0114; G02B 2027/0134; B60K 37/02;
(Continued)

(56) References Cited

U.S. PATENT DOCUMENTS

| 2010/0046075 A1 | 2/2010 | Powell et al. |
| 2011/0157667 A1 | 6/2011 | Lacoste et al. |

(Continued)

FOREIGN PATENT DOCUMENTS

| CN | 102472854 A | 5/2012 |
| JP | 2013-68886 A | 4/2013 |

(Continued)

OTHER PUBLICATIONS

Edward Buckley et al., "Full colour holographic laser projector HUD", Aug. 1, 2008, 5 pages.

(Continued)

*Primary Examiner* — Nitin Patel
*Assistant Examiner* — Cory A Almeida
(74) *Attorney, Agent, or Firm* — Sughrue Mion, PLLC

(57) ABSTRACT

Disclosed is an apparatus and method for displaying a three-dimensional (3D) image. A 3D display apparatus includes an optical layer including a plurality of optical elements, a projector configured to scan a light onto the optical layer, and a processor configured to control a timing at which the projector scans the light onto the optical layer and generate a 3D image in a viewing space based on the timing at which the light is scanned onto the optical layer.

21 Claims, 15 Drawing Sheets

(58) Field of Classification Search
CPC ......... B60K 2370/1531; H04N 13/189; H04N 13/32; H04N 13/322; H04N 13/363
See application file for complete search history.

(56) References Cited

U.S. PATENT DOCUMENTS

| | | | | |
|---|---|---|---|---|
| 2011/0164294 | A1* | 7/2011 | Shimizu | G02B 27/0172 359/13 |
| 2014/0198141 | A1* | 7/2014 | Kasazumi | G09G 3/3611 345/697 |
| 2017/0255020 | A1* | 9/2017 | Tam | G06F 3/013 |
| 2018/0095278 | A1* | 4/2018 | Masson | G02B 27/0172 |
| 2019/0243152 | A1* | 8/2019 | Gache | G02B 30/27 |

FOREIGN PATENT DOCUMENTS

| | | |
|---|---|---|
| KR | 10-2016-0066942 A | 6/2016 |
| KR | 10-2018-0057263 A | 5/2018 |
| KR | 10-2019-0012630 A | 2/2019 |
| KR | 10-2019-0029331 A | 3/2019 |
| KR | 10-2019-0034775 A | 4/2019 |
| KR | 10-2019-0034885 A | 4/2019 |
| KR | 10-2019-0047442 A | 5/2019 |
| KR | 10-2019-0047453 A | 5/2019 |
| KR | 10-2019-0050876 A | 5/2019 |
| KR | 10-2019-0060426 A | 6/2019 |
| WO | 2018/024863 A1 | 2/2018 |

OTHER PUBLICATIONS

Dong-Jin Han et al., "Optical System Design of Compact Head-Up Display(HUD) using Micro Display", Journal of the Korea Academia-Industrial cooperation Society, vol. 16, No. 9, 2015, pp. 6227-6235.
Communication dated May 4, 2020, issued by the European Patent Office in counterpart European Application No. 19213532.5.
Communication dated Dec. 20, 2022 issued by the National Intellectual Property Administration, English PRC, in counterpart Chinese Application No. 201911258806.X.

* cited by examiner

520

1000

1100

1150

APPARATUS AND METHOD FOR DISPLAYING THREE-DIMENSIONAL IMAGE

CROSS-REFERENCE TO RELATED APPLICATION

This application is based on and claims priority from Korean Patent Application No. 10-2018-0159967, filed on Dec. 12, 2018 in the Korean Intellectual Property Office, the disclosure of which is incorporated herein by reference in its entirety.

BACKGROUND

1. Field

Methods and apparatuses consistent with example embodiments relate to an apparatus and method for displaying a three-dimensional (3D) image.

2. Description of the Related Art

A head-up display (HUD) system may generate a virtual image in front of a driver and display information in the virtual image, thereby providing the user with a variety of information. The information provided to the driver may include, for example, navigation information and dashboard information such as a vehicle speed, a fuel level, and an engine revolution per minute (RPM). The driver may more easily recognize the information displayed in front without turning his or her gaze during driving, and thus, driving safety may improve. In addition to the navigation information and the dashboard information, the HUD system may also provide the driver with, for example, a lane indicator, a construction indicator, an accident indicator, and a pedestrian detection indicator using augmented reality (AR), to assist with driving when a view is not so clear.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of the disclosure, there is provided a three-dimensional (3D) display apparatus comprising: an optical layer comprising a plurality of optical elements; a projector configured to scan a light onto the optical layer; and a processor configured to control a timing at which the projector scans the light onto the optical layer and generate a 3D image in a viewing space based on the timing at which the light is scanned onto the optical layer.

The processor may be further configured to generate the 3D image based on virtual scanned pixels implemented by the light scanned according to the timing.

The processor may be further configured to generate the 3D image by controlling a color of the light based on the timing at which the light is scanned onto the optical layer.

The processor may be further configured to generate the 3D image by controlling a plurality of light sources generating the light based on a value of a scanned pixel corresponding to the timing at which the light is scanned onto the optical layer.

The processor may be further configured to generate the 3D image based on a direction of the light according to a corresponding positional relationship between the plurality of optical elements and the virtual scanned pixels.

The optical layer may be further configured to refract or reflect a light of a first wavelength, and transmit a light of a second wavelength different from the first wavelength.

An optical parameter of the optical layer may be determined based on a position of the projector and a position of the viewing space.

The optical layer may be provided on or inside a windshield of a vehicle.

The optical layer may comprise a holographic optical element (HOE) lens array.

The HOE lens array may be recorded to provide the 3D image in the viewing space based on a position of the projector and a position of the viewing space.

The optical layer may comprise a lens array coated with an optical coating layer having a transmittance which changes based on a wavelength of a visible light.

The projector comprises at least one laser scanning module configured to scan a laser beam onto the optical layer.

The at least one laser scanning module may comprise: a plurality of laser light sources configured to output laser beams corresponding to a plurality of colors; a beam combiner configured to synthesize outputs of the plurality of laser light sources into a single integrated beam; and a scanning mirror configured to control a direction of the single integrated beam to scan the single integrated beam onto the optical layer.

The 3D image may comprise an integral image forming multiple viewing zones by integrating elemental images including 3D information of a target object.

The 3D display apparatus may further comprise: an immersion layer provided on the optical layer, wherein the immersion layer and the optical layer have a same refractive index.

The 3D display apparatus may further comprise: a compensating lens provided between the projector and the optical layer, wherein the compensating lens is configured to correct an image distortion.

According to another aspect of the disclosure, there is provided a three-dimensional (3D) display method comprising: obtaining information related to a timing at which a light is scanned by a projector onto an optical layer; controlling the timing at which the projector scans the light onto the optical layer; and generating a 3D image in a viewing space based on the timing at which the light is scanned onto the optical layer.

The 3D image may be generated based on virtual scanned pixels implemented by the light scanned according to the timing.

The generating the 3D image may comprise controlling a color of the light based on the timing at which the light is scanned onto the optical layer.

The generating the 3D image may comprise controlling a plurality of light sources generating the light based on a value of a scanned pixel corresponding to the timing at which the light is scanned onto the optical layer.

The 3D image may be generated based on a direction of the light according to a corresponding positional relationship between a plurality of optical elements included in the optical layer and the virtual scanned pixels.

The optical layer may be configured to refract or reflect a light of a first wavelength, and transmit a light of a second wavelength different from the first wavelength.

An optical parameter of the optical layer may be determined based on a position of the projector and a position of the viewing space.

The optical layer may be provided on or inside a windshield of a vehicle.

The optical layer may comprise a holographic optical element (HOE) lens array.

The HOE lens array may be recorded to provide the 3D image in the viewing space based on a position of the projector and a position of the viewing space.

The optical layer may comprise a lens array coated with an optical coating layer having a transmittance which changes based on a wavelength of a visible light.

The projector may comprise at least one laser scanning module configured to scan a laser beam onto the optical layer.

The laser scanning module may comprise: a plurality of laser light sources configured to output laser beams corresponding to a plurality of colors; a beam combiner configured to synthesize outputs of the plurality of laser light sources into a single integrated beam; and a scanning mirror configured to control a direction of the integrated beam to scan the integrated beam onto the optical layer.

The 3D image may comprise an integral image forming multiple viewing zones by integrating elemental images including 3D information of a target object.

According to another aspect of the disclosure, there is provided a non-transitory computer-readable storage medium storing instructions that, when executed by a processor, cause the processor to perform the 3D display method.

According to another aspect of the disclosure, there is provided a three-dimensional (3D) display apparatus comprising: a memory configured to store one or more instructions; and a processor configured to execute the one or more instructions to: obtain a first timing information associated with a first wavelength a light; obtain a second timing information associated with a second wavelength of the light; control a projector to scan the light with the first wavelength onto an optical layer during a first timing period based on the first timing information and scan the light with the second wavelength onto the optical layer during a second timing period based on the second timing information; and generate the 3D image in a viewing space based on the light scanned by the projector.

The 3D display apparatus may further comprises the projector comprising: a scanning mirror configured to control a direction of the light; and a laser scanning module configured to output the light through the scanning mirror, wherein the laser scanning module is further configured to scan the light in a vertical direction or a horizontal direction.

The 3D display apparatus may further comprise the optical layer comprising: a first optical element configured to refract or reflect a light of a first wavelength, and transmit a light of a second wavelength different from the first wavelength; and a second optical element configured to refract or reflect the light of the second wavelength, and transmit the light of the first wavelength.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
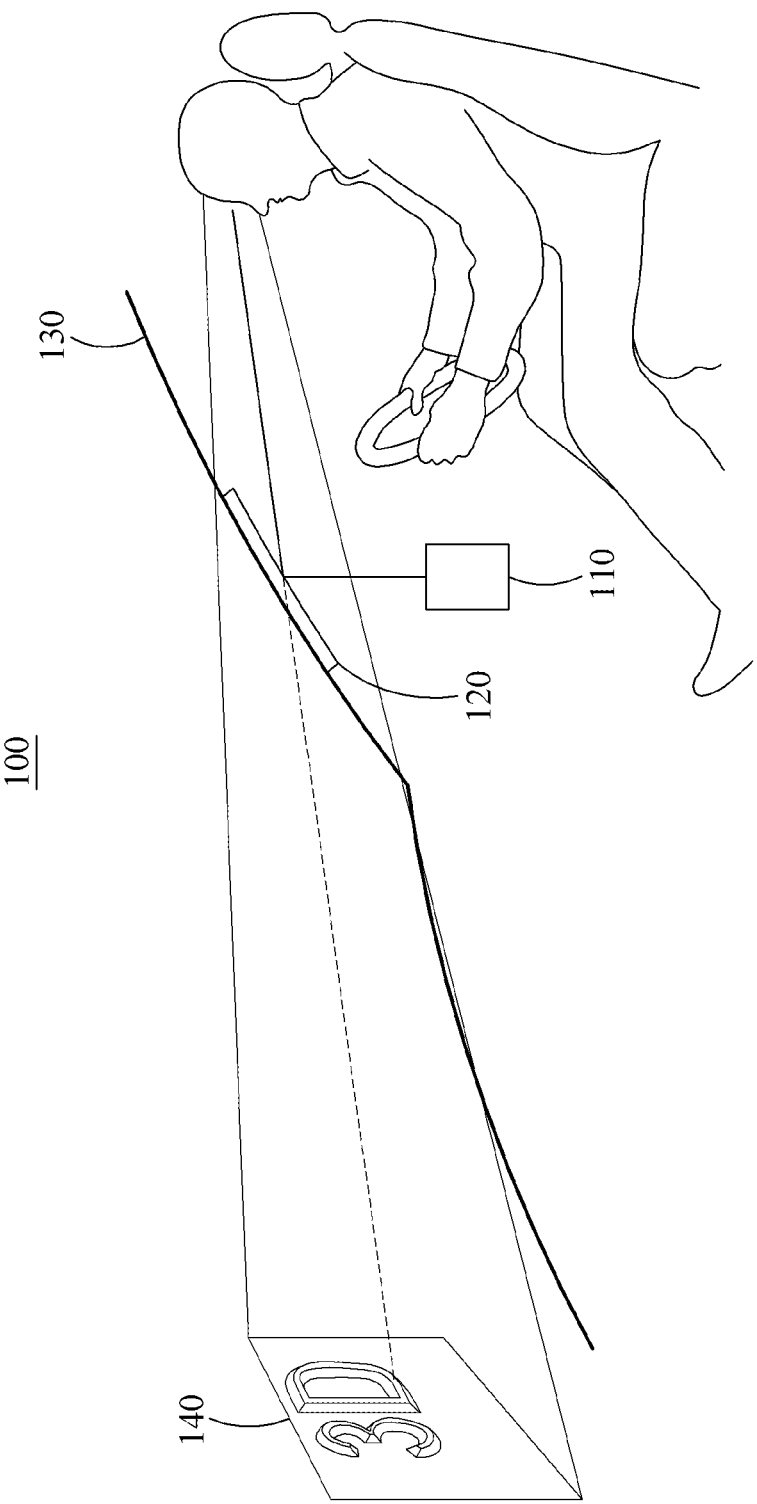
FIG. 1 illustrates a three-dimensional (3D) display apparatus according to an example embodiment.

Reference will now be made in detail to example embodiments, which are illustrated in the accompanying drawings, wherein like reference numerals refer to the like elements throughout. Example embodiments are described below in order to explain the disclosure by referring to the figures.

The following structural or functional descriptions are to merely describe the example embodiments, and the scope of the example embodiments is not limited to the descriptions provided in the disclosure. Various changes and modifications can be made to one or more of the example embodiments by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present. In addition, it should be noted that if it is described in the disclosure that one component is "directly connected" or "directly joined" to another component, still other component may not be present therebetween. Likewise, expressions, for example, "between" and "immediately between" and "adjacent to" and "immediately adjacent to" may also be construed as described in the foregoing.

As used herein, the singular forms are intended to include the plural forms as well, unless the context clearly indicates otherwise. It should be further understood that the terms "comprises" and/or "comprising," when used in this disclosure, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

FIG. 1 illustrates a three-dimensional (3D) display apparatus according to an example embodiment.

Referring to FIG. 1, a configuration of a 3D display apparatus 100 is illustrated.

The 3D display apparatus 100 is an apparatus which implements a 3D image 140, and may implement the 3D image 140, for example, by providing different images to a left eye and a right eye of a user. A binocular disparity may cause the user to experience 3D effects.

In general, a panel and a disparity separating device may be needed to implement a 3D image. For example, the 3D display apparatus may provide a 3D image by disposing the disparity separating device, for example, a parallax barrier or a lenticular lens, on a front surface of the panel and disposing appropriate view images on pixels of the panel. The lenticular lens may control a direction of a beam propagated to a 3D space using a characteristic of a light being refracted when passing through the lens, and the parallax barrier may control a direction of a beam propagated to a 3D space by selectively transmitting a light using a slit.

The 3D display apparatus 100 may generate the 3D image 140 using a method of scanning a light to an optical layer 120 without using a display panel. FIG. 1 illustrates a head-up display (HUD) system using the 3D display apparatus 100, as an example. Hereinafter, for ease of description, an example of the HUD system will be described. However, example embodiments of the 3D display apparatus 100 are not limited to the HUD system, and may be applied to all kinds of display apparatuses such as a TV, a digital information display (DID), a monitor, and a mobile device in various manners.

The 3D display apparatus 100 may include a projector 110 and the optical layer 120. The projector 110 may scan a light to the optical layer 120. The optical layer 120 may include a plurality of optical elements. An optical element may be a smallest unit to generate a multiview image. Lights output from the optical elements may be gathered at a pitch in a viewing space. According to an example embodiment, the pitch may be a predetermined pitch. The optical elements may also be referred to as 3D pixels. A 3D pixel may refract or reflect only a light of a particular wavelength, and transmit a light of a wavelength other than the particular wavelength. According to an example embodiment, the particular wavelength may be a predetermined wavelength. According to an embodiment, the specific wavelength may be a range of wavelengths.

To refract or reflect only a light of a predetermined wavelength and transmit a light of a wavelength other than the predetermined wavelength, the optical layer 120 may include a lens array coated with an optical coating layer having a transmittance which changes based on a wavelength of a visible light. For example, dichroic mirror coating which selectively increases a reflectance with respect to a predetermined wavelength and increases a transmittance with respect to the other wavelengths may be applied to a surface of a lens array of a general optical lens.

Parameters of the optical layer 120 may be determined based on a position of the projector and a position of the predetermined viewing space. For example, refractive indices of the optical elements included in the optical layer 120 may be determined based on a position of the projector and a position of the predetermined viewing space. A method of determining the parameters of the optical layer 120 will be described in detail below with reference to FIG. 7A according to an example embodiment.

The projector 110 may scan a light of a predetermined wavelength to the optical layer 120. A single 3D pixel to which the light is scanned by the projector 110 may output a light in a designed direction. According to an embodiment, the light may be scanned by the projector 110 for a predetermined time. Lights output from the 3D pixels may form a view image. The 3D display apparatus 100 may represent 3D spatial points using the plurality of 3D pixels.

The 3D display apparatus 100 may render an image to be generated on the optical layer 120. Here, "rendering" may be an operation of determining or generating two-dimensional (2D) images to be displayed on the optical layer 120 to provide the 3D image 140 to the user. For example, "rendering" may be an operation of generating the 2D images to be displayed on the optical layer 120 attached to an inner surface of a windshield 130, a front window of a vehicle, or inserted into the windshield 130 to provide the 3D image 140 in a particular viewing space of the user. The particular viewing space may be a predetermined viewing space of the user. Image information may be data related to an image generated on the optical layer 120. For example, the image information may include data related to a size and a color of the image generated on the optical layer 120.

According to an example embodiment, the "rendering" operation may be performed by a processor included in the 3D display apparatus 100. Here, the processor may be implemented by hardware modules, software modules, or various combinations thereof. The processor may control the image information based on a timing at which the light is scanned to the optical layer to provide the 3D image in the predetermined viewing space. The predetermined viewing space may refer to a space in which the user may continuously observe the 3D image at positions of the eyes of the user or positions in vicinity of the eyes, even when the user moves from side to side.

The 3D image 140 may include a multiview image and an integral image. For example, multiview imaging may implement a 3D image by providing images corresponding to two different viewpoints among a plurality of viewpoints to both eyes of the user. For example, the user may view an image corresponding to a first viewpoint with the left eye and view an image corresponding to a second viewpoint with the right eye, thereby experiencing 3D effects from a corresponding 3D image. Integral imaging may implement a 3D image by storing 3D information of a target object in a form of elemental images using a lens array including a plurality of elemental lenses and integrating the elemental images stored through the lens array. Integral imaging will be described further below with reference to FIGS. 11A and 11B.

Figure 2:
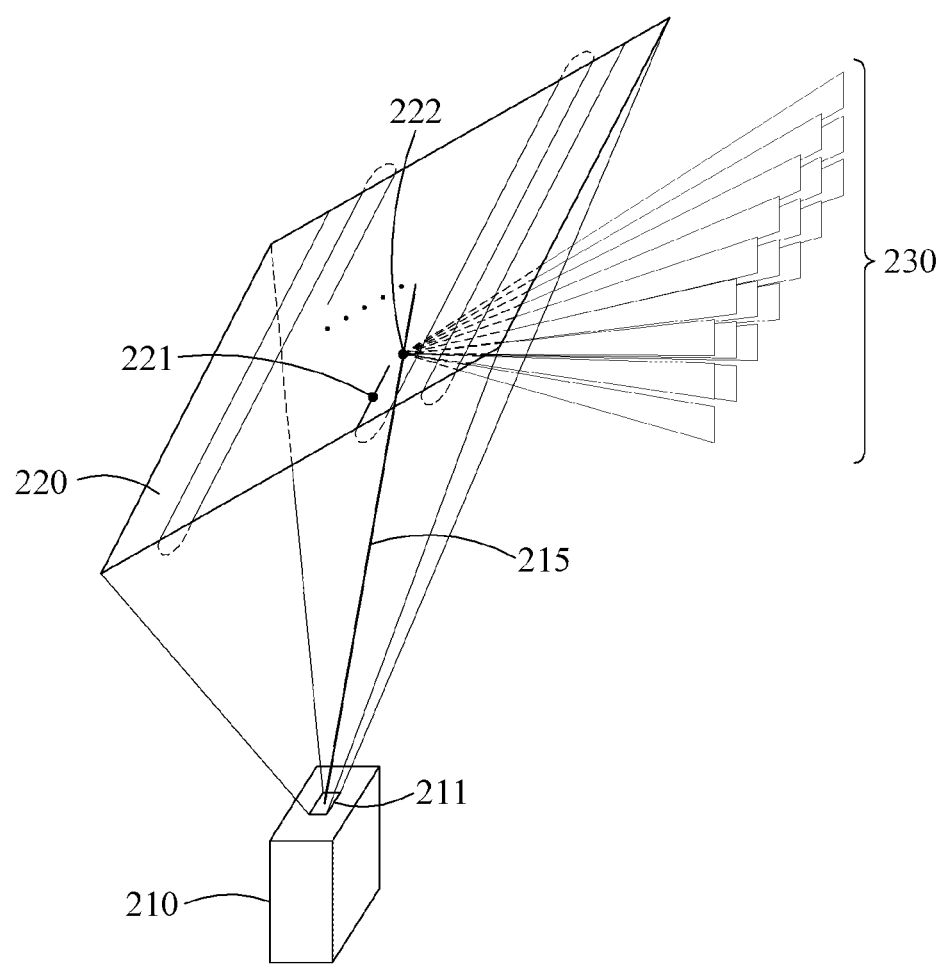
FIG. 2 illustrates a distribution of beams output from a 3D display apparatus according to an example embodiment.

FIG. 2 illustrates a distribution of beams output from a 3D display apparatus according to an example embodiment.

Referring to FIG. 2, a projector may scan a light to an optical layer 220. The projector may include at least one laser scanning module 210 configured to scan a laser to the optical layer 220. The light scanned by the projector may include a laser beam scanned by the laser scanning module 210. A single laser scanning module may operate as a single projector, or at least two laser scanning modules may operate as a single projector.

The laser scanning module 210 may be a device configured to output a beam through a scanning mirror 211 capable of direction control using a reflecting mirror. The laser scanning module may output the beam after beams output respectively from a plurality of laser light sources are combined through a semi-transmissive optical device. According to an example embodiment, the plurality of laser light sources may be configured to output laser beams corresponding to a plurality of colors, For example, the plurality of laser light sources may be a red laser light source, a green laser light source, and a blue laser light source. The laser scanning module 210 will be described further below with reference to FIG. 6.

The laser scanning module 210 may scan a line of a second direction, for example, a line at a time in a lateral direction, while moving a laser beam in a first direction toward the optical layer 220, for example, moving down from the top, by rotating the scanning mirror 211. The laser scanning module 210 may generate a 2D image on the optical layer 220 through laser beam scanning. The scanning mirror of the laser scanning module 210 may rotate at a predetermined interval to scan a laser beam to the optical layer 220.

A plurality of beams 230 may be determined in a 3D space based on the 2D image represented on the optical layer 220. For example, the plurality of beams generated in the 3D space may change based on image information of the 2D image displayed on the optical layer 220. To output a beam of different information, for example, a different color, to a different position of the optical layer 220 in response to rotation of the scanning mirror, the image information and the scanning interval of the scanning mirror may be synchronized. For example, information related to a laser beam may change sequentially based on the image information and the scanning interval.

The optical layer 220 may include a plurality of optical elements 221 and 222. Scanned pixels may be implemented by changing beams to be scanned to the plurality of optical elements based on a timing at which a laser is scanned. The scanned pixels may not be real pixels, but virtual pixels acting as pixels implemented by laser. Laser beams may be scanned and may maintain a linear form in the optical layer 220. Thus, through on-off control of the laser beams at a predetermined time interval based on the image information, separate beams to be scanned to the plurality of optical elements 221 and 222 included in the optical layer 220 may be generated, and the scanned pixels may be implemented by the beams. For example, a first scanned pixel corresponding to the optical element 221 may be implemented by a laser beam 215, and a second scanned pixel corresponding to the optical element 222 may be implemented by the laser beam 215 while moving the laser beam 215 down from the top by rotating the scanning mirror 211.

Propagation directions of beams output from optical elements may be determined based on directions of beams according to a corresponding positional relationship between the optical elements and scanned pixels, and thus 3D spatial points may be represented.

Figure 3:
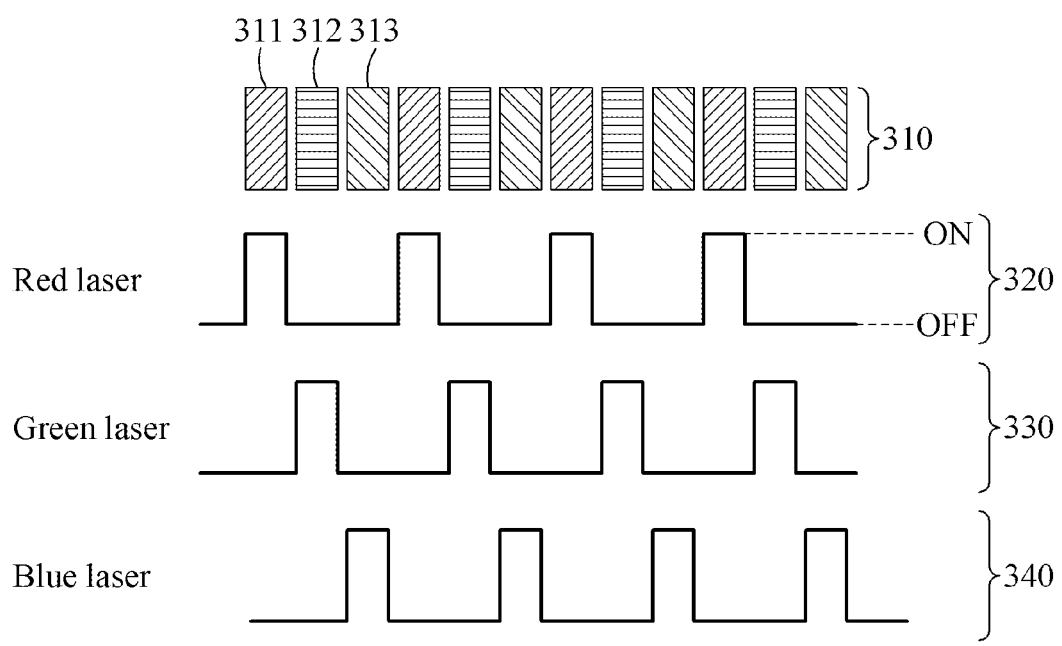
FIG. 3 illustrates a method of implementing scanned pixels corresponding to red, green, and blue (RGB) subpixels of a panel according to an example embodiment.

FIG. 3 illustrates a method of implementing scanned pixels corresponding to red, green, and blue (RGB) subpixels of a panel according to an example embodiment.

Referring to FIG. 3, a 3D display apparatus may control image information by controlling a color of a light based on a timing at which the light is scanned to an optical layer.

As described above, to separate a spatial 3D image, the 3D display apparatus may dispose a disparity separating device, for example, a parallax barrier or a lenticular lens, on a front surface of a panel and may dispose appropriate view image on pixels of the panel, thereby providing a 3D image.

A general RGB panel 310 may have a pixel structure in which a red (R) subpixel, a green (G) subpixel, and a blue (B) subpixel are included in a single pixel. The 3D display apparatus may provide a 3D image using scanned pixels, instead of pixels of a real panel. In detail, the scanned pixels may be implemented by controlling RGB laser light sources based on image information at scanning timings corresponding to positions of the RGB subpixels.

For example, a red (R) scanned pixel may be formed by outputting only a red (R) laser beam 320 and not outputting, but rather blocking a green (G) laser beam 330 and a blue (B) laser beam 340 at a scanning timing corresponding to the position of the R subpixel of the RGB panel 310. A green (G) scanned pixel and a blue (B) scanned pixel may be formed on the same principle based on the positions of the G subpixel and the B subpixel.

Further, by adjusting a brightness of a beam through modulation of an output laser beam of each laser light source based on the image information simultaneously with on-off control of the RGB laser light sources at a predetermined time interval based on the image information, a color of a scanned pixel may be controlled.

Figure 4A:
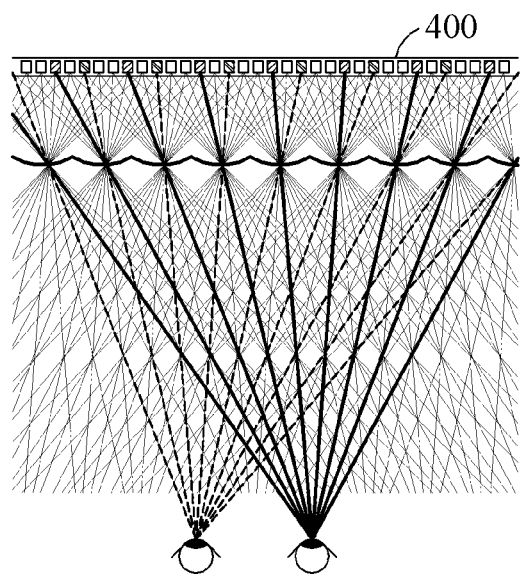
FIG. 4A illustrates a general multiview image generating method.
Figure 4B:
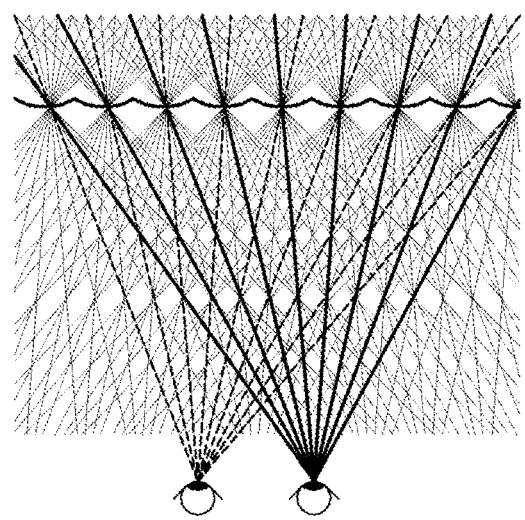
FIG. 4B illustrates a multiview image generating method according to an example embodiment.

FIG. 4A illustrates a general multiview image generating method, and FIG. 4B illustrates a multiview image generating method according to an example embodiment. Before the multiview image generating method is described with reference to FIG. 4B, general multiview displaying using a panel will be described in brief with reference to FIG. 4A.

FIG. 4A shows directions in which beams output from a plurality of pixels included in a panel 400 are propagated to a 3D space, when a general multiview display is used to implement autostereoscopic 3D display. The beams generated from the pixels of the panel 400 may propagate uniformly toward a user, having a predetermined direction by a lenticular lens attached to a front surface of the panel 400. When left and right images of different viewpoints are applied to pixels generating beams to be incident to left and right eyes of the user, the user may perceive a 3D image. Each pixel may include subpixels. For example, a single pixel may include RGB subpixels.

FIG. 4B shows directions in which beams output from scanned pixels corresponding to RGB subpixel of a panel are propagated in a 3D space using a projector, rather than using a panel 400, when a 3D display apparatus according to an example embodiment is used.

The 3D display apparatus may include the projector and an optical layer. The optical layer may correspond to a lenticular lens of a general multiview-based 3D display apparatus, in that the optical layer may output a light scanned from the projector as beams including different information in many directions. Although the 3D display apparatus does not include a panel 400, the 3D display apparatus may generate scanned pixels corresponding to RGB subpixels by scanning the light to the optical layer through the projector.

For example, the scanned pixels may be generated through on-off control of RGB laser light sources at a predetermined time interval based on image information at scanning timings corresponding to positions of RGB subpixels. When the light scanned from the projector is adjusted to correspond to the positions of the subpixels of the panel of FIG. 4A, a 3D image may be implemented in a manner similar to that of the general multiview-based 3D display apparatus.

Figure 5A:
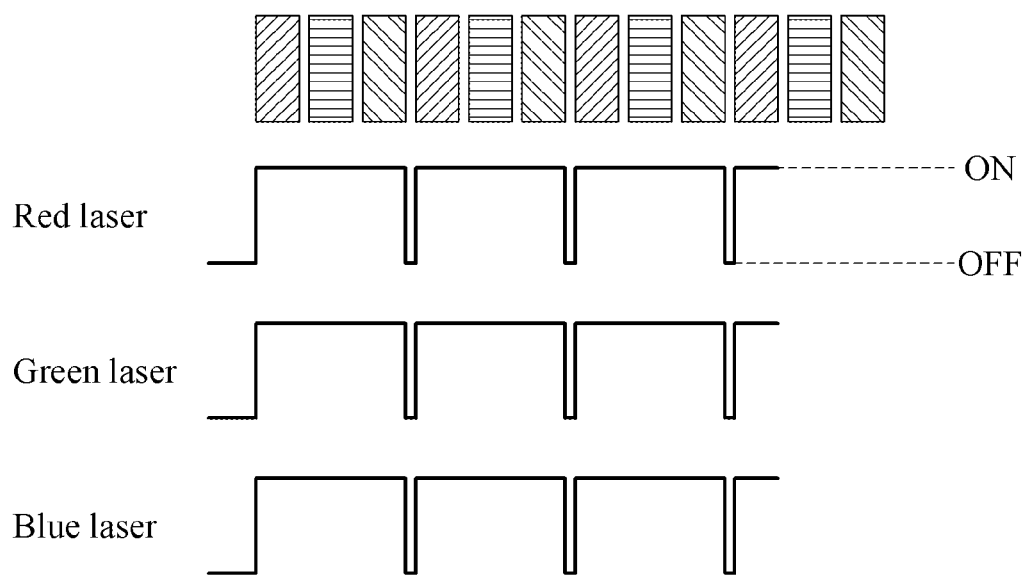
FIGS. 5A and 5B illustrate methods of implementing white (W) pixels using scanned pixels.
Figure 5B:
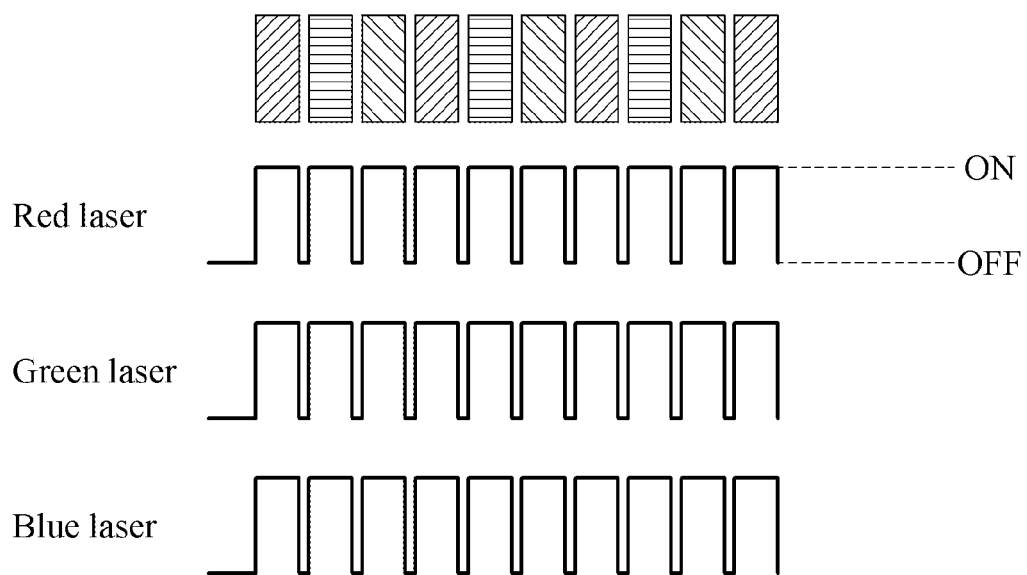

FIGS. 5A and 5B illustrate methods of implementing white (W) pixels using scanned pixels. In a first example 510 illustrated in FIG. 5A, a 3D display apparatus may implement W scanned pixels by controlling on-off of RGB laser light sources based on timings of scanned pixel units, and represent a gray level of a beam through modulation at the same time. In a second example 520 illustrated in FIG. 5B, the 3D display apparatus may implement W scanned pixels by controlling on-off of RGB laser light sources based on timings of subpixel units in a scanned pixel.

In another example, as shown in FIG. 3, W scanned pixels may be implemented by controlling a brightness of each subpixel to be identical, without simultaneously controlling on-off of subpixels in a scanned pixel.

Figure 6:
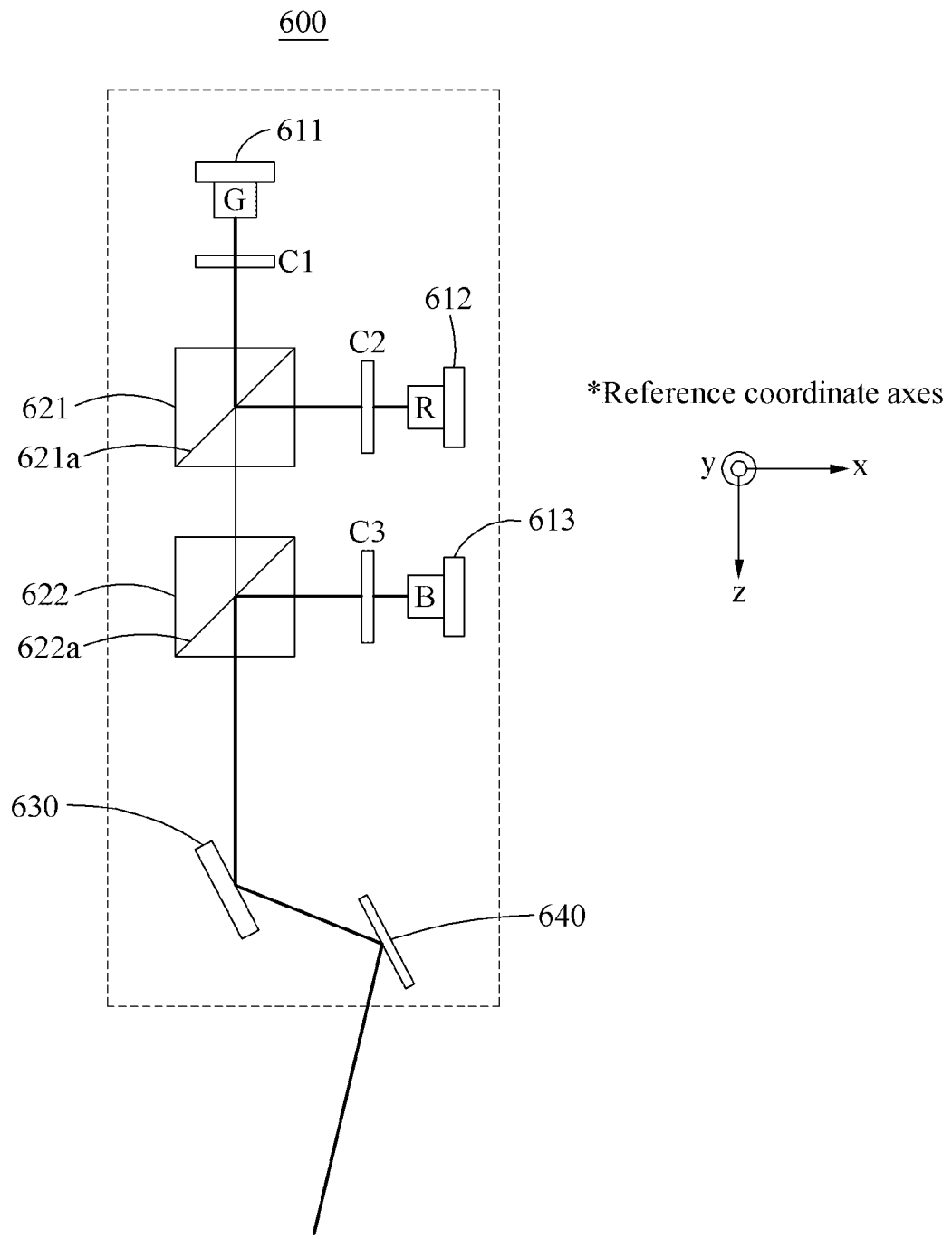
FIG. 6 illustrates a structure of a laser scanning module according to an example embodiment.

FIG. 6 illustrates a structure of a laser scanning module according to an example embodiment.

Referring to FIG. 6, a laser scanning module 600 may include a red (R) laser light source 612 configured to output a red laser beam, a green (G) laser light source 611 configured to output a green laser beam, a blue (B) laser light source 613 configured to output a blue laser beam, condensers C1, C2, and C3 configured to concentrate lights output from the R, G, and B laser light sources, beam combiners 621 and 622 configured to synthesize outputs of the plurality of laser light sources into a single integrated beam, at least one reflecting mirror 630 configured to control a path of the beam, and a scanning mirror 640 configured to control a direction of the integrated beam to scan the integrated beam to an optical layer.

The beam combiners 621 and 622 may include dichroic mirrors 621a and 622a configured to reflect only lights of predetermined wavelengths generated from the R, G, and B laser light diodes and concentrated through the condensers and transmit lights of the other wavelengths. For example, the dichroic mirror 621a may have a characteristic of reflecting only a red laser beam, and the dichroic mirror 622a may have a characteristic of reflecting only a blue laser beam. A green beam may pass through the dichroic mirrors 621a and 622a, and a red beam may pass through the dichroic mirror 622a. Thus, the outputs of the RGB laser light sources may be synthesized into a single integrated beam using the dichroic mirrors 621a and 622a.

The scanning mirror 640 may be manufactured using micro electro mechanical system (MEMS) technology, and generate a 2D image by scanning laser beams focused on a single point to the optical layer using two driving axes. The 2D image may be implemented as a set of horizontal lines of which positions are different in a vertical direction.

The laser scanning module 600 may be simply structured and easily miniaturized and thus, utilized as a handheld projector. Further, by increasing a scanning angle of the scanning mirror 640, a field of view may be easily increased. For example, it may be difficult in practice to mount a HUD system of a great size due to a limited space in a dashboard of a vehicle. When the HUD system is configured using the laser scanning module 600, a 3D HUD image with a wide field of view may be provided to a driver.

Figure 7A:
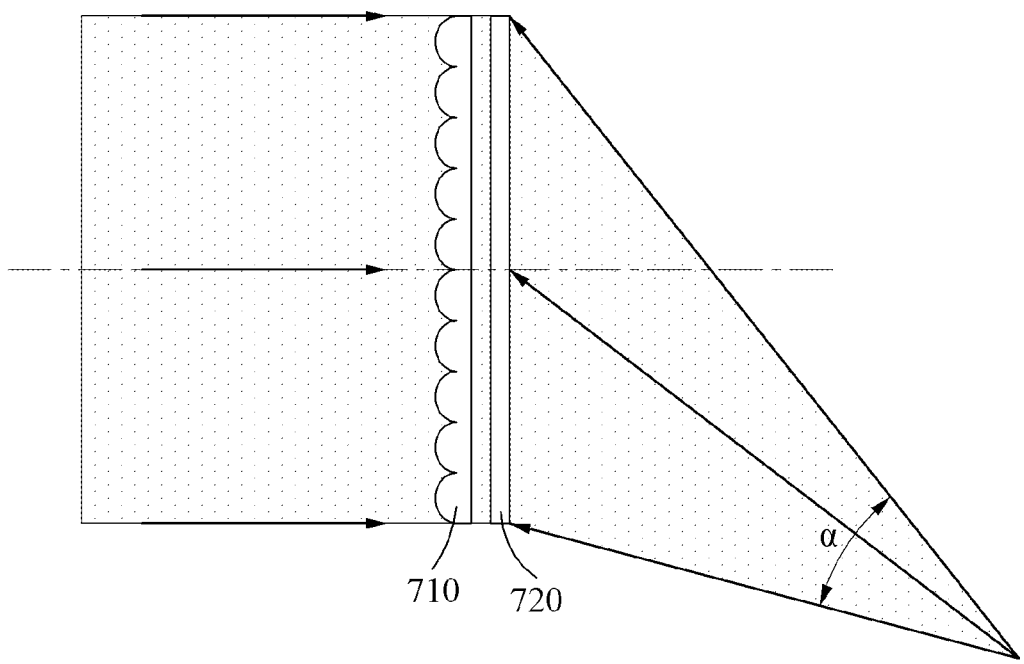
FIG. 7A illustrates a method of manufacturing a holographic optical element (HOE) lens array according to an example embodiment.

FIG. 7A illustrates a method of manufacturing a holographic optical element (HOE) lens array according to an example embodiment.

Referring to FIG. 7A, an optical layer may include an HOE lens array. An HOE may have a narrow wavelength bandwidth and be used as an optical device only in a region of a predetermined wavelength. The HOE lens array may be manufactured using a general optical lens array 710 and a photopolymer 720. The HOE lens array may be recorded, for example, on the photopolymer, in view of a position of a projector and a position of a predetermined viewing space. Recording the HOE lens array may be determining optical parameters of a plurality of optical elements included in the HOE lens array acting as an optical layer. For example, refractive indices of the optical elements included in the optical layer 120 or 220 may be determined in view of the position of the projector and the position of the predetermined viewing space.

The HOE lens array may be recorded using a reference beam incident from the position of the projector toward the general optical lens array 710 and the photopolymer 720 at a predetermined divergence angle α and a signal beam horizontally proceeding toward the predetermined viewing space in a state in which the general optical lens array 710 and the photopolymer 720 overlap. Although FIG. 7A illustrates the general optical lens array 710 being provided in a vertical direction, the general optical lens array 710 may also be manufactured in a horizontal direction or in both, vertical and horizontal, directions.

Figure 7B:
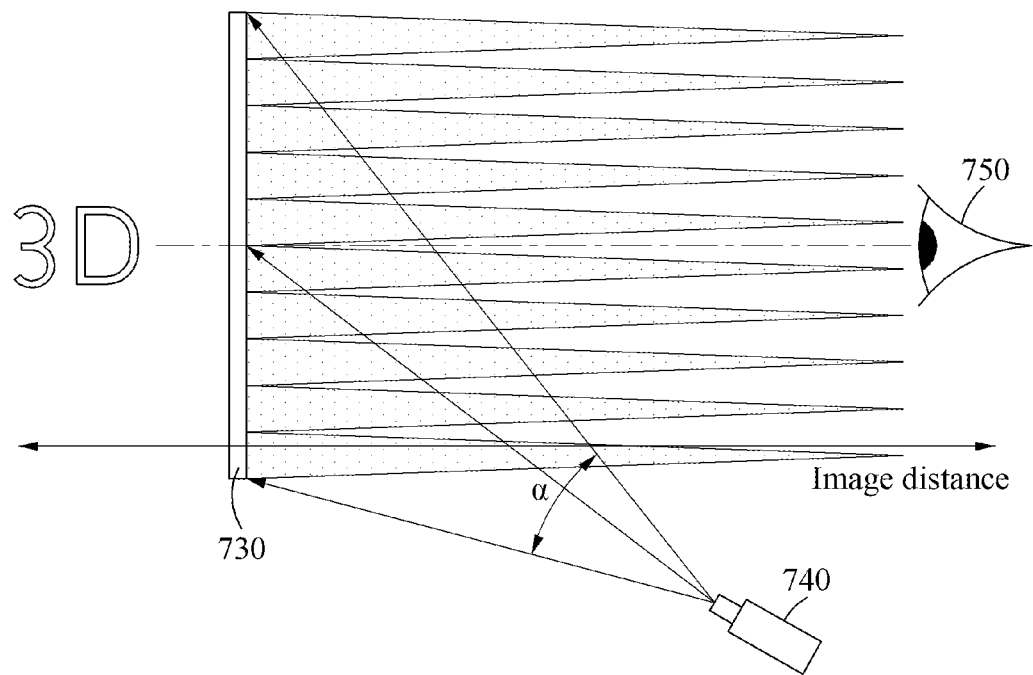
FIG. 7B illustrates a method of implementing an HOE lens array according to an example embodiment.

FIG. 7B illustrates a method of implementing an HOE lens array according to an example embodiment.

Referring to FIG. 7B, an HOE lens array 730 may be manufactured to refract or reflect only a light of a predetermined wavelength and to transmit a light of a wavelength other than the predetermined wavelength, and thereby act as a disparity separating device, for example, a parallax barrier or a lenticular lens. For example, the HOE lens array 730 manufactured using the method described with reference to FIG. 7A may respond only to RGB laser beams and transmit lights of the other wavelengths.

When a projector 740 is disposed at a position the same as that for recording and a light is scanned to the HOE lens array 730 at a predetermined divergence angle α, a user may observe a 3D image at a position of a predetermined viewing space 750.

Figure 8:
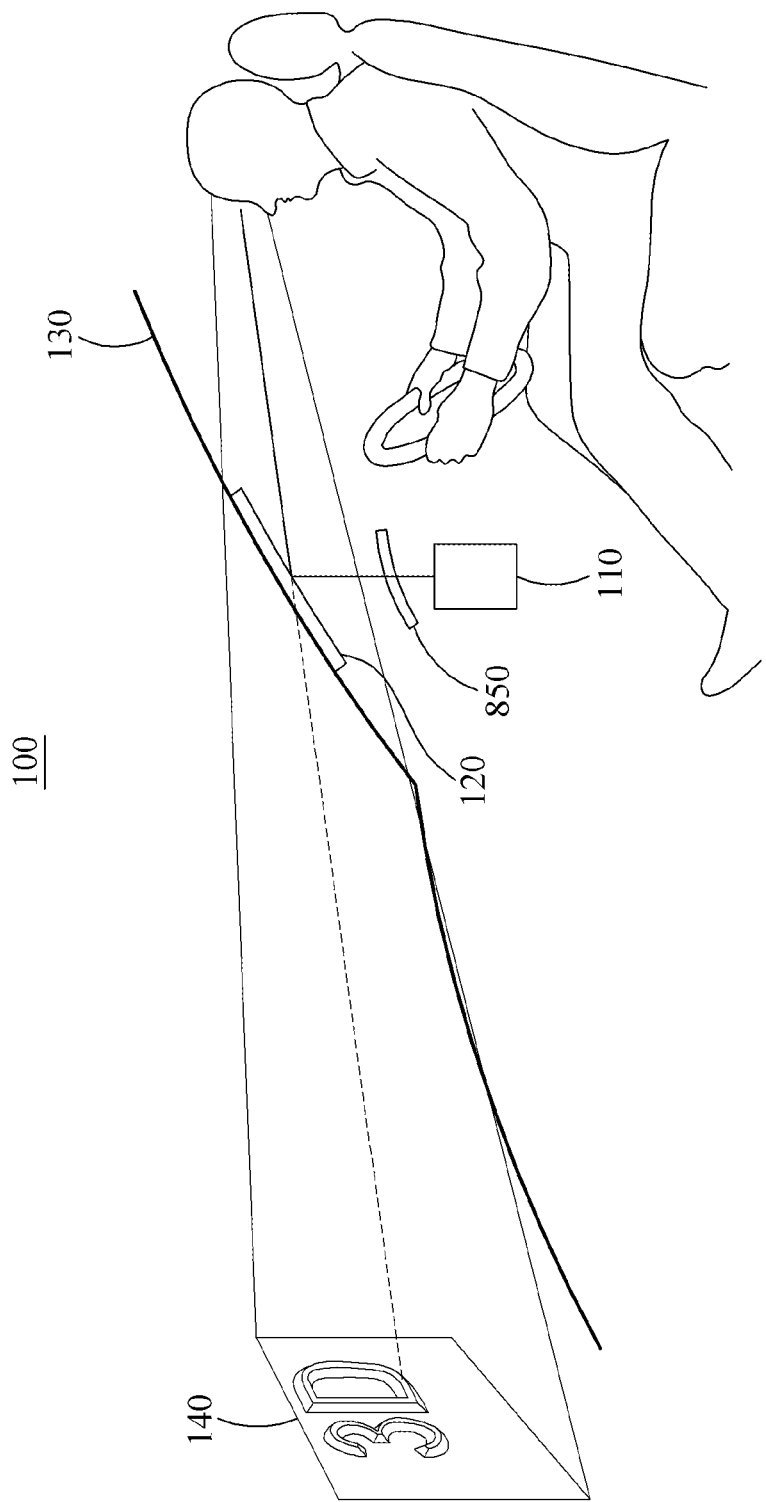
FIG. 8 illustrates a 3D display apparatus including a compensating lens according to an example embodiment.

FIG. 8 illustrates a 3D display apparatus including a compensating lens according to an example embodiment.

Referring to FIG. 8, a HUD system using the 3D display apparatus 100 is illustrated. The 3D display apparatus 100 may further include a compensating lens 850.

The compensating lens 850 may be an image distortion correcting device. According to an example embodiment, by additionally providing the compensating lens 850 between the projector 110 and an optical layer 820 to correct an image distortion, a burden of the optical layer 120 may be reduced.

In another example embodiment, when manufacturing an HOE lens array, a plurality of HOE layers may be provided such that one layer may act as a lens array, and the other layer may perform a function to correct an image distortion.

Figure 9:
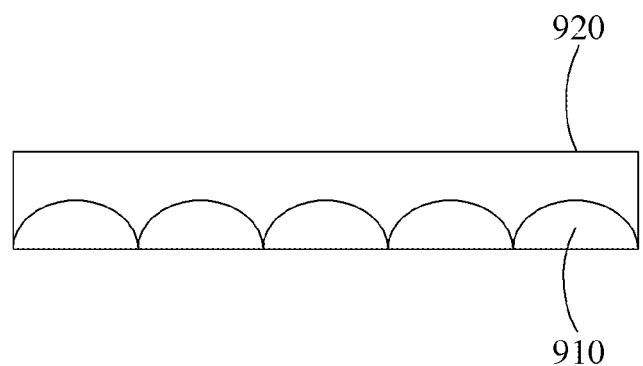
FIG. 9 illustrates a 3D display apparatus including an immersion layer according to an example embodiment.

FIG. 9 illustrates a 3D display apparatus including an immersion layer according to an example embodiment.

An optical layer 910 may refract or reflect only a light of a predetermined wavelength and transmit a light of a wavelength other than the predetermined wavelength. For example, the optical layer 910 may respond only to a laser beam scanned by a projector without affecting a transmittance of an external light using a wavelength selectivity, thereby removing a visibility by the external light.

Referring to FIG. 9, to remove the visibility by the external light, an immersion layer 920 may be applied to the optical layer 910. According to an example embodiment, the immersion layer 920 may have an optical coating which selectively increases a reflectance with respect to a wavelength of a light scanned by the projector and increases a transmittance with respect to the other wavelengths. The immersion layer 920 and the optical layer 910 may have the same refractive index. For example, a refractive index n1 of the optical layer 910 may be identical to a refractive index n2 of the immersion layer 920. Using the immersion layer 920 having a refractive index identical to that of the optical layer 910, a distortion occurring at a target observed through the optical layer 910 may be prevented.

Figure 10:
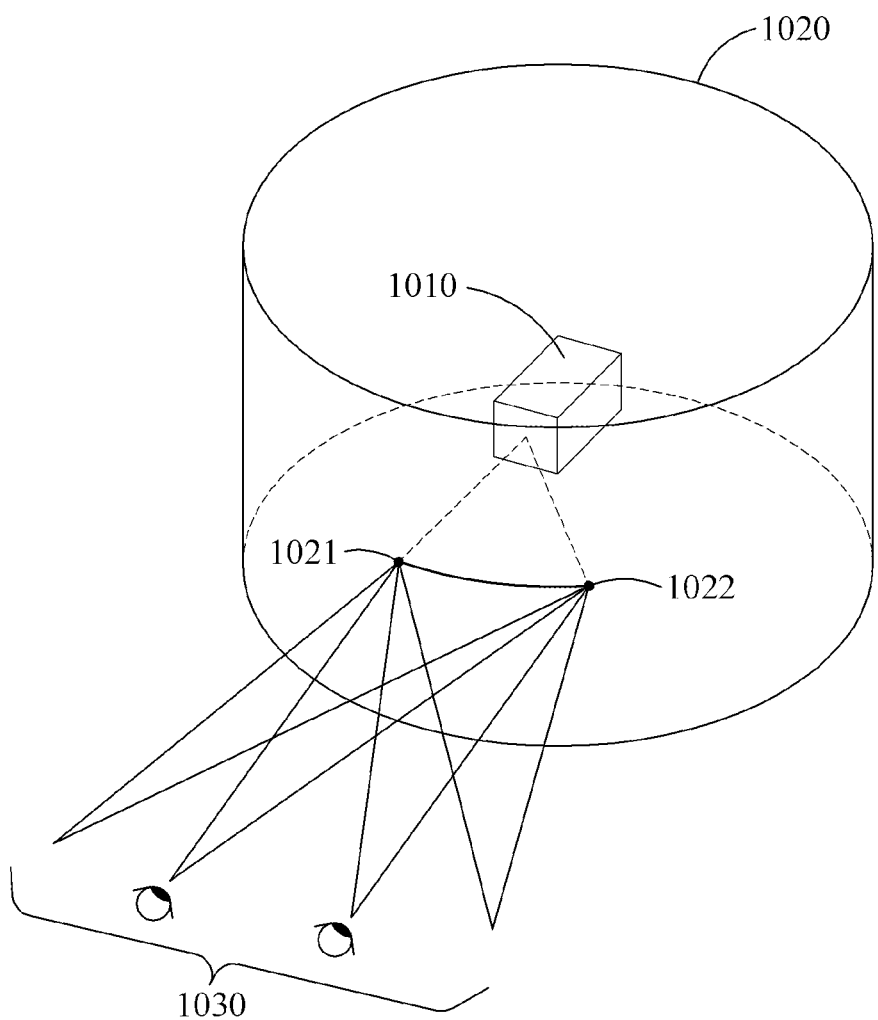
FIG. 10 illustrates a circular display apparatus using a 3D display apparatus according to an example embodiment.

FIG. 10 illustrates a circular display apparatus using a 3D display apparatus according to an example embodiment. The description provided with reference to FIGS. 1 through 9 may also apply to FIG. 10, and thus duplicate description will be omitted for conciseness.

Referring to FIG. 10, a cylindrical display apparatus 1000 using a 3D display apparatus may include a projector 1010 and an optical layer 1020. The optical layer 1020 may have a shape of a side of a cylinder. Hereinafter, for ease of description, a cylindrical display apparatus will be described. However, examples of the 3D display apparatus are not limited to the cylindrical display apparatus, and applied in various shapes.

The projector 1010 may scan a light to the optical layer 1020 through a 360-degree rotation. The cylindrical display apparatus 1000 may represent 3D spatial points using a plurality of optical elements 1021 and 1022 for a user to view at eyebox 1030.

Figure 11A:
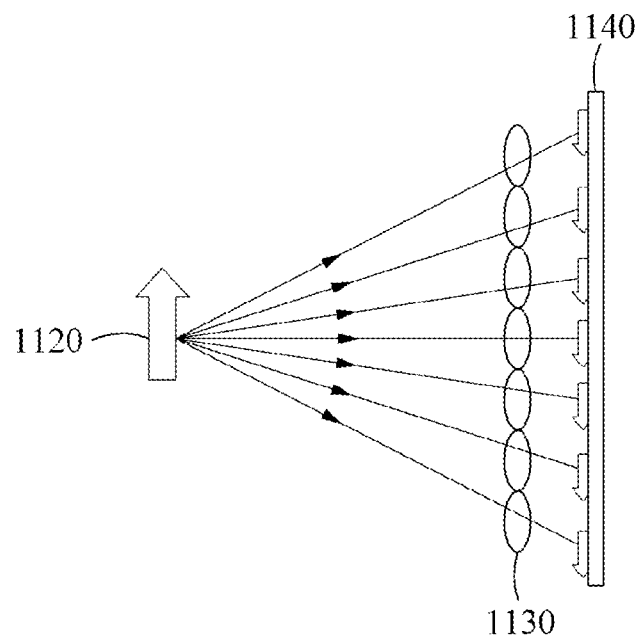
FIGS. 11A and 11B illustrate a method of implementing a 3D image using integral imaging according to an example embodiment.
Figure 11B:
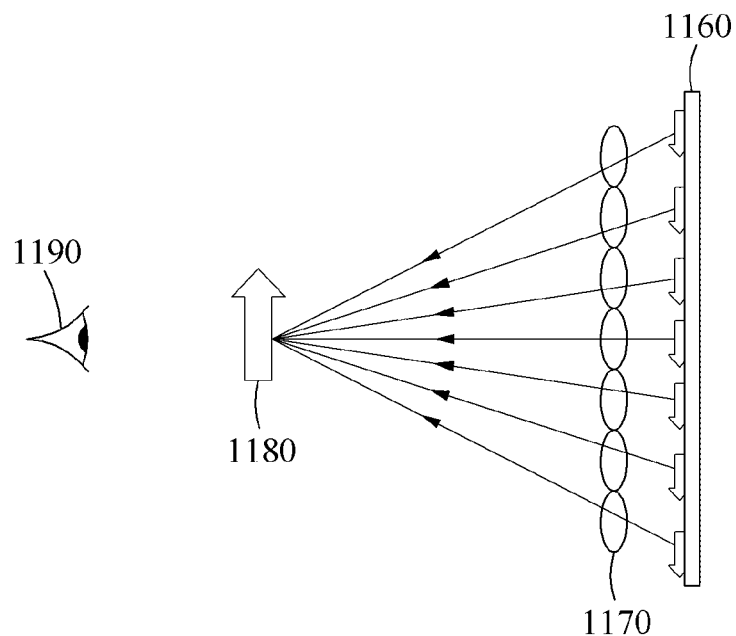

FIGS. 11A and 11B illustrate a method of implementing a 3D image using integral imaging according to an example embodiment.

Referring to FIGS. 11A and 11B, a general integral imaging-based stereoscopic image display apparatus may include an image pickup 1100 as illustrated in FIG. 11A and a display 1150 as illustrated in FIG. 11B. According to an example embodiment, the image pickup 1100 may convert 3D information of a 3D object 1120 into a whole elemental image using a capturing device 1140, such as a camera and a first lens array 1130, and the image pickup 1100 may store the elemental image in the capturing device 1140.

According to an example embodiment, the display 1150 may include a display panel 1160 and a second lens array 1170, and present the whole elemental image displayed on the display panel 1160 in a form of a stereoscopic image 1180 in a predetermined viewing space 1190.

According to general integral imaging, multiple viewing zones with different viewpoints may be formed. The integral imaging-based 3D image display apparatus may use a micro lens array as an optical array. When the micro lens array is used, beams output from the optical array may be controlled to be separated into left and right images in the viewing space.

For the 3D display apparatus to generate a 3D image according to integral imaging, an HOE lens array may be recorded in view of a position of a projector and a position of the predetermined viewing space such that the HOE lens array may act as the micro lens array.

According to an example embodiment, the description and features of one or more example embodiments in FIGS. 1 through 10 may also apply to FIGS. 11A and 11B, and thus duplicate description will be omitted for conciseness. For example, when implementing a 3D image according to integral imaging, scanned pixels as illustrated in FIG. 2 may output images corresponding to direction angles assigned to the corresponding pixels. A direction angle is an angle at which a beam is projected from a scanned pixel. By projecting the output images to the corresponding scanned pixels at predetermined direction angles, a 3D image may be implemented.

Figure 12:
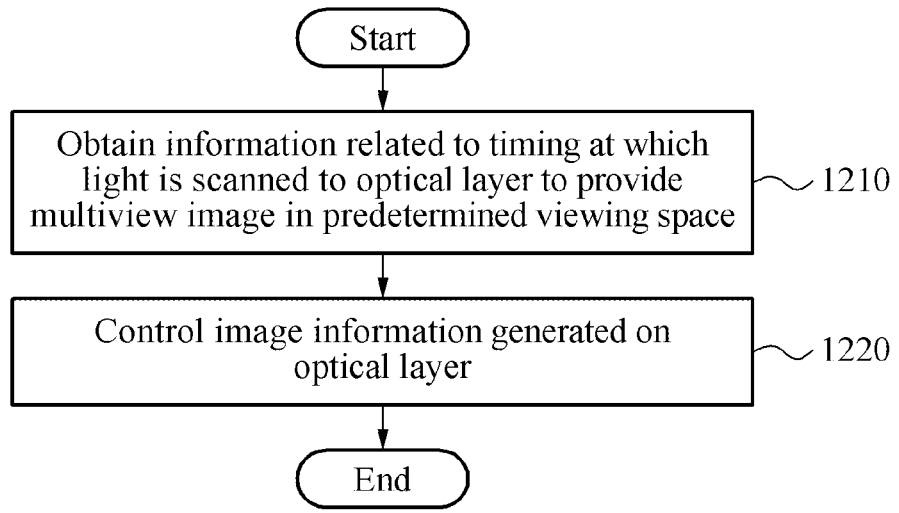
FIG. 12 illustrates a 3D display method according to an example embodiment.

FIG. 12 illustrates a 3D display method according to an example embodiment.

Operations 1210 and 1220 may be performed by the 3D display apparatus 100 of FIG. 1. The 3D display apparatus 100 may be implemented using one or more hardware modules, one or more software modules, or various combinations thereof.

In operation 1210, the 3D display apparatus 100 may obtain information related to a timing at which a light is scanned to an optical layer to provide a 3D image in a predetermined viewing space. For example, in operation 1210, the 3D display apparatus may obtain information about a first timing at which a red (R) scanned pixel may be formed, a second timing at which a green (G) scanned pixel may be formed, and a third timing at which the blue (B) scanned pixel may be formed.

In operation 1220, the 3D display apparatus 100 may control image information generated on the optical layer based on the information related to the timing at which the light is scanned. According to an example embodiment, during the first timing the 3D display apparatus may output only a red (R) laser beam to the position of the R subpixel of the RGB panel 310, but refrain from outputting the green (G) and blue (B) laser beams. For instance, the 3D display apparatus may block the green (G) laser beam 330 and the blue (B) laser beam 340 at the first timing. A green (G) scanned pixel may be formed at a second timing and a blue (B) scanned pixel may be formed at a third timing based on the same principle described about with regard to the red (R) scanned pixel and based on the positions of the G subpixel and the B subpixel.

Figure 13:
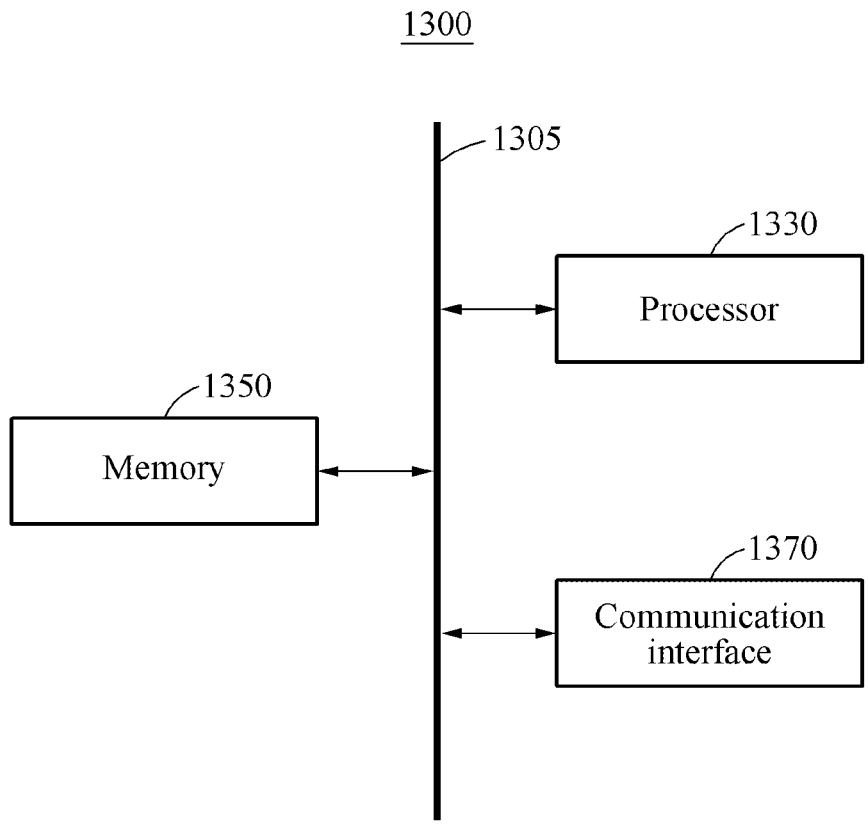
FIG. 13 illustrates a structure of the 3D display apparatus according to an example embodiment.

FIG. 13, the illustrates a structure of the 3D display apparatus 1300 according to an example embodiment. The 3D display apparatus 1300 may include a processor 1330, a memory 1350 and a communication interface 1370, which are all connected to and communicate with each other via a us 1305. According to an example embodiment, the "rendering" operation may be performed by the processor 1330. The processor 1330 may control the image information based on a timing at which the light is scanned to the optical layer to provide the 3D image in the predetermined viewing space. The predetermined viewing space may refer to a space in which the user may continuously observe the 3D image at positions of the eyes of the user or positions in vicinity of the eyes, even when the user moves from side to side.

According to an embodiment, the processor 1330 may communicate with the memory 1350 to store data, retrieve data or retrieve instruction related to performing the control of the image information. According to example embodiment, the communication interface 1370 may be configured to receive external input information and provide the received information to the memory 1350 or the processor 1330. According to example embodiment, the communication interface 1370 may be configured to output information processed by the processor 1330 or retrieved from the memory.

According to an embodiment, the memory 1350 may be configured to store one or more instructions; and the processor 1330 may be configured to execute the one or more instructions to: obtain a first timing information associated with a first wavelength of a light, obtain a second timing information associated with a second wavelength of the light, control a projector to scan the light with the first wavelength onto an optical layer during a first timing period based on the first timing information and scan the light with the second wavelength onto the optical layer during a second timing period based on the second timing information and generate the 3D image in a viewing space based on the light scanned by the projector.

The example embodiments described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) display apparatus comprising:
   an optical layer comprising a plurality of optical elements;
   a projector configured to scan a plurality of color light onto the optical layer; and
   a processor configured to
     control a timing at which each of the plurality of color light is exclusively turned on by the projector to scan the plurality of color light onto the optical layer,
   wherein the projector comprises at least one laser scanning module configured to scan a laser beam onto the optical layer,
   wherein the at least one laser scanning module comprises:
     a plurality of laser light sources configured to output laser beams corresponding to the plurality of color light;
     a beam combiner configured to synthesize outputs of the plurality of laser light sources into a single integrated beam; and
     a scanning mirror configured to control a direction of the single integrated beam to scan the single integrated beam onto the optical layer,
   wherein the processor is further configured to:
     generate a 3D image in a viewing space based on the timing at which the projector scans the plurality of color light onto the optical layer, by controlling the plurality of laser light sources based on a value of a scanned pixel corresponding to the timing at which the plurality of color light is scanned onto the optical layer, so that the 3D image and a scanning interval of the scanning mirror is synchronized to a different position of the optical layer in response to rotation of the scanning mirror,
   wherein the optical layer comprises a holographic optical element (HOE) lens array provided on or inside a windshield of a vehicle, and
   wherein the projector is further configured to scan a single integrated light, generated based on the plurality of color light, directly on the HOE lens array linearly in a first direction of the HOE lens array,
   wherein the HOE lens array is coated with a dichroic optical coating layer having a transmittance which changes based on a wavelength of a visible light.

2. The 3D display apparatus of claim 1, wherein the processor is further configured to generate the 3D image based on a direction of the plurality of color light according to a corresponding positional relationship between the plurality of optical elements and the virtual scanned pixels.

3. The 3D display apparatus of claim 1, wherein the optical layer is further configured to refract or reflect a light of a first wavelength, and transmit a light of a second wavelength different from the first wavelength.

4. The 3D display apparatus of claim 1, wherein an optical parameter of the optical layer is determined based on a position of the projector and a position of the viewing space.

5. The 3D display apparatus of claim 1, wherein the HOE lens array is recorded to provide the 3D image in the viewing space based on a position of the projector and a position of the viewing space.

6. The 3D display apparatus of claim 1, wherein the 3D image comprises an integral image forming multiple viewing zones by integrating elemental images including 3D information of a target object.

7. The 3D display apparatus of claim 1, further comprising:
an immersion layer provided on the optical layer,
wherein the immersion layer and the optical layer have a same refractive index.

8. The 3D display apparatus of claim 1, further comprising:
a compensating lens provided between the projector and the optical layer, wherein the compensating lens is configured to correct an image distortion.

9. The 3D display apparatus of claim 1, wherein the projector is further configured to turn on or turn off each of the plurality of color light onto the optical layer at non-overlapping time periods.

10. The 3D display apparatus of claim 9, wherein the projector is further configured to:
output a red laser beam at a first time period while refraining from outputting a green laser beam and a blue laser beam;
output the green laser beam at a second time period while refraining from outputting the red laser beam and the blue laser beam; and
output the blue laser beam at a third time period while refraining from outputting the red laser beam and the green laser beam.

11. The 3D display apparatus of claim 1, wherein the projector is further configured to:
scan the single integrated light to move in a second direction after the single integrated light is scanned in first direction of the HOE lens array, and
scan the single integrated light to move in a third direction opposite to the first direction.

12. A three-dimensional (3D) display method comprising:
obtaining information related to a timing at which a plurality of color light is scanned by a projector onto an optical layer, wherein the projector includes at least one laser scanning module configured to scan a laser beam onto the optical layer, wherein the at least one laser scanning module includes: a plurality of laser light sources configured to output laser beams corresponding to the plurality of color light a beam combiner configured to synthesize outputs of the plurality of laser light sources into a single integrated beam; and a scanning mirror configured to control a direction of the single integrated beam to scan the single integrated beam onto the optical layer;
controlling the timing at which each of the plurality of color light is exclusively turned on by the projector to scan the plurality of color light onto the optical layer; and
generating a 3D image in a viewing space based on the timing at which the plurality of color light is selectively scanned onto the optical layer, by controlling the plurality of laser light sources based on a value of a scanned pixel corresponding to the timing at which the plurality of color light is scanned onto the optical layer, so that the 3D image and a scanning interval of the scanning mirror is synchronized to a different position of the optical layer in response to rotation of the scanning mirror,
wherein the optical layer comprises a holographic optical element (HOE) lens array provided on or inside a windshield of a vehicle,
wherein the projector scans a single integrated light, generated based on the plurality of color light, directly on the HOE lens array linearly in a first direction of the HOE lens array, and
wherein the HOE lens array is coated with a dichroic optical coating layer having a transmittance which changes based on a wavelength of a visible light.

13. The 3D display method of claim 12, wherein the 3D image is generated based on a direction of the plurality of color light according to a corresponding positional relationship between a plurality of optical elements included in the optical layer and the virtual scanned pixels.

14. The 3D display method of claim 12, wherein the optical layer is configured to refract or reflect a light of a first wavelength, and transmit a light of a second wavelength different from the first wavelength.

15. The 3D display method of claim 12, wherein an optical parameter of the optical layer is determined based on a position of the projector and a position of the viewing space.

16. The 3D display method of claim 12, wherein the HOE lens array is recorded to provide the 3D image in the viewing space based on a position of the projector and a position of the viewing space.

17. The 3D display method of claim 12, wherein the 3D image comprises an integral image forming multiple viewing zones by integrating elemental images including 3D information of a target object.

18. A non-transitory computer-readable storage medium storing instructions that, when executed by a processor, cause the processor to perform the 3D display method of claim 4.

19. A three-dimensional (3D) display apparatus comprising: a memory configured to store one or more instructions; and a processor configured to execute the one or more instructions to:
obtain a first timing information associated with a first wavelength of a light;
obtain a second timing information associated with a second wavelength of the light;
control a projector to scan the light with only the first wavelength onto an optical layer during a first timing period based on the first timing information and scan the light with only the second wavelength onto the optical layer during a second timing period based on the second timing information,
wherein the projector includes at least one laser scanning module configured to scan a laser beam onto the optical layer, wherein the at least one laser scanning module includes:
a plurality of laser light sources configured to output laser beams corresponding to the plurality of color light;
a beam combiner configured to synthesize outputs of the plurality of laser light sources into a single integrated beam; and
a scanning mirror configured to control a direction of the single integrated beam to scan the single integrated beam onto the optical layer; and generate a 3D image in a viewing space based on the light scanned by the projector, by controlling the plurality of laser light sources based on a value of a scanned pixel corresponding to the timing at which the plurality of color light is scanned onto the optical layer, so that the 3D image and a scanning interval of the scanning mirror is synchronized to a different position of the optical layer in response to rotation of the scanning mirror, wherein the optical layer comprises a holographic optical element (HOE) lens array provided on or inside a windshield of a vehicle, and wherein the processor is further configured to control the projected to scan a single integrated light, generated based on a plurality of color light, directly on the lens HOE lens array linearly in a first direction of the HOE lens array, and wherein the HOE lens array is coated with a dichroic optical coating layer having a transmittance which changes based on a wavelength of a visible light.

20. The 3D display apparatus according to claim 19, further comprising:

the projector comprising:

a scanning mirror configured to control a direction of the light; and a laser scanning module configured to output the light through the scanning mirror, wherein the laser scanning module is further configured to scan the light in a vertical direction or a horizontal direction.

21. The 3D display apparatus according to claim 19, further comprising:

the optical layer comprising:

a first optical element configured to refract or reflect a light of the first wavelength, and transmit a light of the second wavelength different from the first wavelength; and a second optical element configured to refract or reflect the light of the second wavelength, and transmit the light of the first wavelength.

* * * * *